United States Patent
Stirn et al.

(10) Patent No.: US 8,002,532 B2
(45) Date of Patent: Aug. 23, 2011

(54) APPARATUS FOR EJECTOR ACTUATION

(75) Inventors: Andrew Keith Stirn, West Harrison, IN (US); James Michael Lightfield, Mason, OH (US); Sean F. Johnson, Hamilton, OH (US)

(73) Assignee: Milacron LLC, Cincinnati, OH (US)

( * ) Notice: Subject to any disclaimer, the term of this patent is extended or adjusted under 35 U.S.C. 154(b) by 155 days.

(21) Appl. No.: 12/538,899

(22) Filed: Aug. 11, 2009

(65) Prior Publication Data

US 2011/0038976 A1  Feb. 17, 2011

(51) Int. Cl.
*B29C 45/40* (2006.01)

(52) U.S. Cl. ........ 425/139; 264/334; 425/556; 425/595; 425/DIG. 221

(58) Field of Classification Search ............. 264/334; 425/139, 556, 595, DIG. 221
See application file for complete search history.

(56) References Cited

U.S. PATENT DOCUMENTS

| | | | |
|---|---|---|---|
| 3,579,740 A * | 5/1971 | Rees | 425/156 |
| 5,122,051 A | 6/1992 | Joyner | |
| 5,599,486 A | 2/1997 | Fujishiro et al. | |
| 5,718,930 A | 2/1998 | Stengel | |
| 5,736,079 A * | 4/1998 | Kamiguchi et al. | 264/40.1 |
| 6,669,877 B2 * | 12/2003 | Matsubayashi et al. | 264/40.1 |
| 7,275,922 B2 * | 10/2007 | Uchiyama et al. | 425/139 |
| 7,291,297 B2 * | 11/2007 | Weatherall et al. | 264/40.1 |
| 2003/0090018 A1 * | 5/2003 | Bulgrin | 264/40.1 |
| 2004/0131723 A1 | 7/2004 | Ickinger | |
| 2008/0089964 A1 * | 4/2008 | Kianpour et al. | 425/150 |
| 2008/0199556 A1 | 8/2008 | Dantlgraber | |

FOREIGN PATENT DOCUMENTS

| | | |
|---|---|---|
| DE | 102004033102 A1 | 2/2006 |
| JP | 7214610 A | 8/1995 |
| WO | 20090079748 A1 | 7/2009 |

OTHER PUBLICATIONS

International Search Report in International Application No. PCT/US2010/039780, mailed Oct. 14, 2010.
Written Opinion of the International Searching Authority in International Application No. PCT/US2010/039780, mailed Oct. 14, 2010.
Abstract from European Patent Office for JP7214610.

* cited by examiner

*Primary Examiner* — Yogendra Gupta
*Assistant Examiner* — Emmanuel S Luk
(74) *Attorney, Agent, or Firm* — John W. Gregg

(57) ABSTRACT

Force from an electrically operated ejector mechanism of a molding machine is selectably supplemented by operation of second actuators. Second actuators are advantageously fluid (hydraulic or pneumatic) operated to supplement force provided by an electrically operated primary actuator when the ejector mechanism is driven to advance ejector members into cavities of a mold assembly. The second actuators may be enabled to be operated during automatically controlled execution of a machine cycle of operation and may be operated in response to operator selections when machine operation is controlled manually.

18 Claims, 3 Drawing Sheets

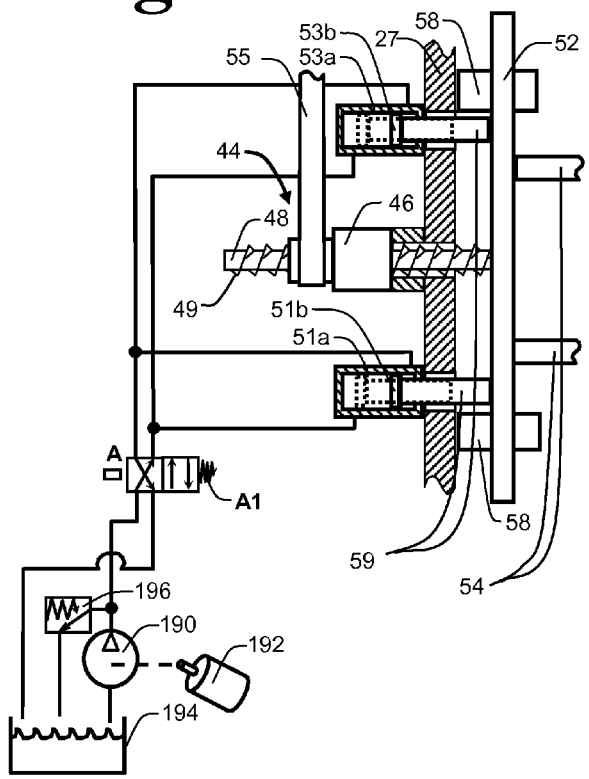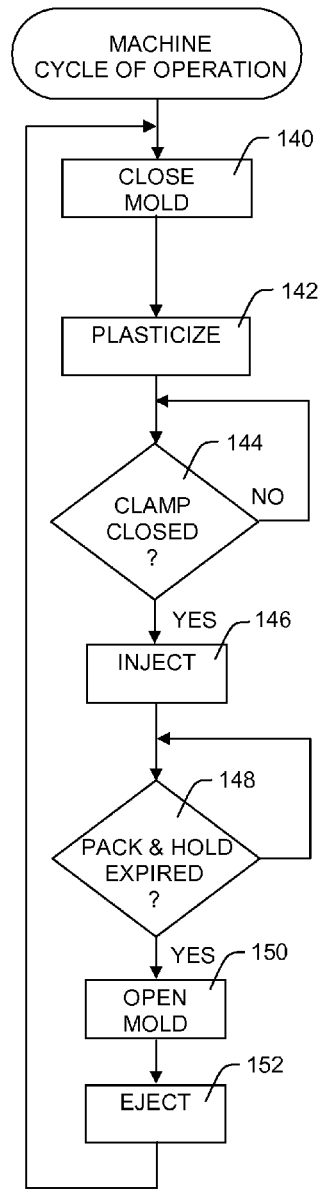

APPARATUS FOR EJECTOR ACTUATION

BACKGROUND OF THE INVENTION

1. Field of the Invention

This invention relates to molding machines, more particularly, to ejector mechanisms commonly used in molding machines. The invention is directed particularly to electrically operated ejector devices having apparatus for selectably increased ejection force.

2. Description of Related Art

In molding machines, plastically deformable material to be molded is formed in cavities defined by mating mold sections and allowed to cure to a state wherein the material will not unacceptably deform upon removal from the mold cavity. The cured material defines molded articles that are removed from the machine upon separation of the mating mold sections. However, as it is common that articles will adhere to one of the mold sections, it is typical to provide ejector pins communicating with the mold cavity and linked to movable ejector members in the mold assembly comprising the mating mold sections. Motion of the ejector pins is effective to dislodge molded articles from the mold section, assuring their complete removal. The movable members are typically translatable and include links to the ejector pins to move the ejector pins between retracted positions whereat the free ends of the ejector pins are flush with mold cavity surfaces and forward positions whereat the free ends protrude into the mold cavity.

It is known to use electrically operated actuators to operate ejection devices of molding machines. In particular, it is known to use rotating electrical machines with motion converters to effect linear motion of ejector members. It is known that ejection of articles that have relatively high ratios of internal depth to overall cross sectional area or surface features such as threads can require unusually high ejection force to separate molded articles from so-called mold cores. However, to increase the maximum force exerted by an electrically driven ejection device to accommodate ejection of such articles can result in substantial increases of cost, either as a result of sizing of electrical components and motion converters or to interpose force multipliers between the motor and ejector members. In light of such limitations, there is a need to enable an increase of force exerted on ejector members without the prohibitive attendant costs of known constructions.

SUMMARY OF THE INVENTION

It is an object of the present invention to provide improved apparatus for actuation of ejection devices wherein supplemental force is selectably applied in combination with force exerted by a primary electrically operated actuator.

It is a further object of the present invention to provide an improved apparatus for actuation of ejection devices wherein at least one hydraulically operated actuator is engaged with an ejector member driven by an electrically operated actuator.

Further objects and advantages of the invention shall be made apparent from the accompanying drawings and the following description thereof.

In accordance with the aforesaid objects the present invention provides apparatus for actuating an ejection device of a molding machine comprising a first actuator comprising an electrically operated device and coupled to advance ejector elements into a mold cavity and retract the ejector elements from the cavity, at least one second actuator comprising a fluid operated device for supplementing force applied to the ejector elements to separate molded articles from the mating mold members, and a selector for controlling operation of the second actuators to selectably operate the second actuators to supplement force exerted by the first actuator as the ejector elements are moved in the direction to contact a molded article within the mold cavity.

BRIEF DESCRIPTION OF THE DRAWINGS

FIG. 2 is a schematic diagram illustrating an arrangement for operation of supplemental actuators in accordance with the invention.

FIGS. 3a and 3b are flow charts of procedures for controlling operation of the machine and ejector mechanism of FIG. 1 to selectably operate supplemental ejector actuators.

DETAILED DESCRIPTION OF THE PREFERRED EMBODIMENT

To illustrate the invention, a preferred embodiment as implemented for an injection molding machine shall be described. It is contemplated that the invention could as well be applied to other molding machines, such as, but not limited to blow molding machines.

Figure 1:
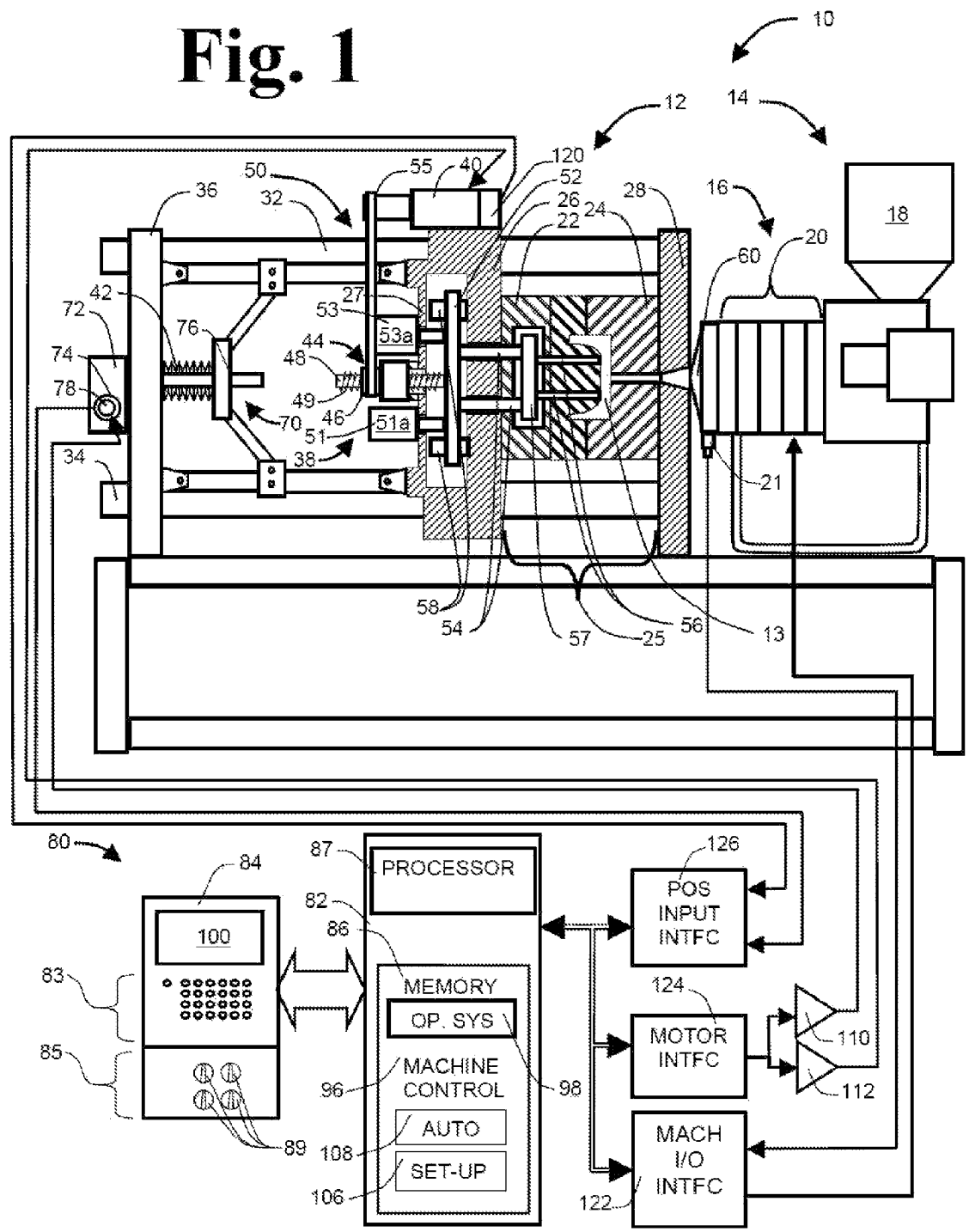
FIG. 1 is a schematic diagram of an injection molding machine with a power operated ejector mechanism.

Referring to FIG. 1, injection molding machine 10 includes a clamp assembly 12 and injection unit 14. Typical of plastic injection molding machines, raw material in the form of pellets and/or powders is introduced to a plasticizing unit 16 through hopper 18. Plasticizing unit includes a barrel portion 60, typically surrounded by external heating elements 20, and an internal material working screw, not shown. As raw material is plasticized by a combination of heating and material working, the plasticized material advances toward the exit end of barrel 60, displacing the interior screw away from clamp assembly 12. Once a desired volume of material has been plasticized, the working screw is advanced within barrel portion 60 to force material through the exit end of barrel portion 60 into a cavity 13 of mold assembly 25. Mold assembly 25 comprises mating mold member 22 supported by movable platen 26 and mating mold member 24 supported by fixed (stationary) platen 28. Molding surfaces of mating mold members 22 and 24 define cavity 13. Clamp assembly 12 holds mating mold members 22 and 24 together during injection of material into cavity 13 and thereafter until the injected material has sufficiently solidified to be removed without unacceptable deformation. Movable platen 26 is then retracted, separating mating mold member 22 from mating mold member 24 to permit release of molded articles from molding surfaces.

Continuing with reference to FIG. 1, clamp assembly 12 comprises fixed platen 28, movable platen 26, thrust or "die height" platen 36 and a mechanism for effecting translation of movable platen 26, such as a toggle mechanism 70. Forces required to overcome separation forces acting on mating mold members 22 and 24 during injection are generated by the toggle mechanism 70 in reaction with strain rod pairs 32 and 34 supported at opposite ends by fixed platen 28 and thrust platen 36. Movable platen 26 is slidably supported, for example, on strain rod pairs 32 and 34, for reciprocation between "open" and "closed" positions, "closed" referring to the advanced position as shown in FIG. 1. Other arrangements for sliding support of movable platen 26 are known, including tracks or ways comprising base members upon which movable platen 26 is supported from the bottom thereof rather than being supported by strain rods comprising strain rod pairs 32 and 34. A toggle link mechanism 70, interposed between movable platen 26 and thrust platen 36, is operated by a rack and pinion combination comprising a rack 42 and pinion (not shown) within drive case 72. The pinion is rotated by motor 74 to translate rack 42 horizontally toward and away from fixed platen 28. Rack 42 is connected with toggle link crosshead 76. Alternatively, reciprocation of toggle link crosshead 76 may be effected by other known actuators including a motor driven low friction screw and nut combination or hydraulically operated actuators. Toggle link mechanism 70 is preferably operable to a "lock-over" configuration, as shown in FIG. 1 wherein serial pivoting links between thrust platen 36 and movable platen 26 are longitudinally aligned. Mold assembly 25 is "closed", i.e., mating mold components 22 and 24 are abutted, by operation of motor 74 to move toggle link crosshead 76 to extend pivoting links of the toggle link mechanism to move movable platen 26 away from thrust platen 36. Mold assembly 25 is "opened", i.e., mating mold members 22 and 24 are separated, by operating motor 74 to fold pivoting links of the toggle link mechanism 70 to move movable platen 26 toward thrust platen 36. Advantageously, motor 74 is a servo motor and an indication of relative position of toggle link crosshead 76 and, hence, movable platen 26 is provided by signals produced by position transducer 78 such as, for example, a linear or rotary potentiometer or a linear or rotary encoder.

Continuing with reference to FIG. 1, movable ejector members 57 within mold section 22 are coupled to ejector elements for contacting molded articles such as ejector pins 56 that are movable into and out of mold cavity 13. Movable ejector members 57 comprise a plate as illustrated by FIG. 1, and additional couplings, guides, springs, and the like as are known to movably support the plate within the mold assembly, couple the plate with ejector rods 54 of ejector mechanism 38 and connect the plate with ejector pins 56. The number, size(s) and placement of ejector pins 56 are chosen according to characteristics of the article(s) defined by mold cavity 13. Displacement of movable ejector members 57 away from movable platen 26 advances ejector pins 56 to cause the free ends thereof to protrude beyond molding surfaces of mold section 22 intersected by the longitudinal axes of ejector pins 56. Protrusion of ejector pins 56 into cavity 13, or like repeated protrusions, is effective to dislodge an article from mold section 22. While shown in FIG. 1 as intersecting a vertical flat surface, the mold cavity surfaces at the points of intersection with ejector pins 56 may be curved and/or at various angles. The free ends of ejector pins 56 are made to conform to the mold cavity surface at the points of intersection therewith so that when ejector pins 56 are retracted, the free ends thereof are flush with the immediately surrounding molding surfaces of cavity 13. While it is known to provide mechanical linkages to effect translation of movable ejector members 57 with separation of mold sections 22 and 24, it is also known to provide power operated ejector mechanisms to improve the effectiveness of ejector pins 56 to dislodge articles.

A power operated ejector mechanism 38 is illustrated in FIG. 1 mounted to yoke portion 27 of movable platen 26. Ejector mechanism 38 includes ejector plate 52, ejector rods 54, first (primary) actuator 50, second actuators 51 and 53, and guide rods 58. Actuators 50 is coupled to ejector plate 52 so that operation of actuators 50 moves ejector plate 52 toward and away from mold assembly 25. Second actuators 51 and 53 are not coupled to ejector plate 52, but pistons thereof are effective to supplement force of actuator 50 when it is operated to move ejector plate 52 toward mold assembly 25. Although two second actuators 51 and 53 are shown, four second actuators may advantageously be used and arranged relative to primary actuator 50 so that forces applied by the second actuators produce offsetting torques acting on ejector plate 52 relative to the point of application of force by primary actuator 50. By virtue of coupling of ejector plate 52 to movable ejector members 57, operation of actuators 50, 51 and 53 effects translation of movable ejector members 57 within mating mold member 22 and, consequently, translation of ejector pins 56 relative to cavity 13.

Continuing with reference to FIG. 1, first actuator 50 comprises motor 40, motion converter 44 and drive belt 55. Motion converter 44 comprises, rotatable nut 46 rotatably mounted to yoke portion 27 so as to move with movable platen 26 and screw 48 engaged with rotatable nut 46 so as to be linearly movable relative to rotatable nut 46 and, hence, linearly movable relative yoke portion 27 of movable platen 26. Motor 40 is, advantageously, an electrically operated rotatable machine wherein an armature and stator are arranged for rotation of one relative to the other. As is conventional, motor 40 is preferably a servo-motor and includes or works in combination with a position measuring transducer 120 which measures relative angular position and provides signals representative thereof. Transducer 120 may be, for example, a rotary potentiometer or encoder. Also, as is well known for control of servo motors, other transducers may be used with motor 40 to measure, for example, angular velocity or to detect relative locations of motor elements for motor current commutation. Rotation of motor 40 imparts rotation to rotatable nut 46 by coupling of drive belt 55. Other driving means as are known could be used to couple motor 40 to rotatable nut 46, use of drive belt 55 affords expanded choice for location of motor 40 relative to rotatable nut 46. As is known, threads (not shown) within rotatable nut 46 engage flights (threads) 49 of screw 48 so that rotation of rotatable nut 46 effects linear motion of screw 48 relative to rotatable nut 46 in the direction of the longitudinal axis of screw 48. Advantageously, rotatable nut 46 and screw 48 are a so-called "roller screw" and drive nut combination wherein a plurality of planetary threaded rollers (not shown) within rotatable nut 46 engage flights 49 of screw 48.

Second actuators 51 and 53 are piston-in-cylinder devices, advantageously operated by pressurized fluid, i.e., liquid (hydraulic operation) or gas (pneumatic operation) by controlling pressure of fluid acting on opposite sides of a piston member (51$b$ and 53$b$ (FIG. 2)) slidably supported within a cylinder member such as cylinder members 51$a$ and 53$a$. Piston rods 59 are connected to pistons 51$b$ and 53$b$ of actuators 51 and 53, respectively, and are movable relative to ejector plate 52 so as to come in contact with ejector plate 52 with advance of pistons 51$b$ and 53$b$ toward ejector plate 52 as shown in FIG. 1.

Advantageously, ejector plate 52 is slidably supported by, for example, support rods 58, is movable with movable platen 26, and is movable relative to movable platen 26. Ejector rods 54 pass through movable platen 26 and connect ejector plate 52 with movable ejector members 57. While plural ejector rods 54 are illustrated in FIG. 1, it is contemplated that ejector mechanism 38 may comprise a single ejector rod coupling movable ejector members 57 with ejector plate 52. In consequence of the connection of ejector plate 52 with movable ejector members 57, movement of ejector plate 52 toward and away from mold assembly 25 moves movable ejector members 57 relative to mating mold member 22 and, consequently, moves ejector pins 56 relative to cavity 13.

In accordance with the invention, second actuators 51 and 53 are selectably operated to supplement force exerted by first actuator 50 on ejector plate 52 movable ejector members 57 and ejector pins 56. In mold assemblies wherein core elements of molding surfaces comprise relatively deep projections within an interior of a molded article or comprise surface features such as threads, the relatively large area of contact of surfaces of molded articles and molding surfaces that are transverse to the parting plane of mating mold members, or the engagement of thread flights, increases resistance of separation of molded articles from mold surfaces so that molded articles may fail to be separated from molding surfaces by application of force produced by actuator 50 alone. Supplemental force, advantageously applied with commencement of forward motion of ejector plate 52, and produced by second actuators 51 and 53 improves likelihood that resistance to separation of molded articles from mold surfaces will be overcome. It is contemplated that operation of second actuators 51 and 53 may be effected by intervention of a machine operator under circumstances where a molded article is discovered to be retained on a mold member after separation of mating mold members. Alternatively, it is contemplated that operation of second actuators 51 and 53 may be selectably effected under automated control during the execution of a machine cycle of operation.

FIG. 2 is a schematic showing of an arrangement for controlling flow of hydraulic fluid to second actuators 51 and 53. Pump 190 is driven by motor 192 and draws hydraulic fluid from reservoir 194. Pressure relief valve 196 permits pressurized hydraulic fluid to return to reservoir 194 when the pressure of fluid supplied by pump 190 exceeds a predetermined pressure. Second actuators 51 and 53 are operated to cause piston rods 59 to apply force to ejector plate 52 at least during initial advance of ejector plate 52 toward mold assembly 25 effected by first actuator 50. Electrically operated valve A is arranged to provide fluid communication between a source of pressurized hydraulic fluid and one of the interior volumes of cylinders 51a and 53a segregated by, respectively pistons 51b and 53b while simultaneously connecting each of the other interior volumes of cylinders 51a and 53a to a return line to return hydraulic fluid to reservoir 194. As illustrated, valve A is biased, for example by a spring A1 so that it is necessary to operate valve A only when it is desired to drive pistons 51b and 53b in one direction, the spring restoring valve A to drive pistons 51b and 53b in the opposite direction. With commencement of operation of actuator 50 to move ejector plate 52 toward mold assembly 25, valve A is operated to convey pressurized hydraulic fluid to cylinders 51a and 53a so as to apply force on pistons 51b and 53b in the same direction as force applied by actuator 50 to ejector plate 52. Hence, force acting on pistons 51b and 53b supplements force applied by actuator 50 to ejector plate 52. Following initial advance of ejector plate 52, valve A is released so that spring A1 conveys pressurized hydraulic fluid so as to apply force to pistons 51b and 53b to retract piston rods 59 away from ejector plate 52 (retracted positions of pistons 51b and 53b and piston rods 59 are shown dashed in FIG. 2). Withdrawal of piston rods 59 from contact with ejector plate 52 reduces resistance for retraction of ejector plate 52 away from mold assembly 25 by first actuator 50. In the event repeated operations of first actuator 50 are effected, second actuators 51 and 53 can likewise be operated during each initial repeated advance of ejector plate 52.

Mechanisms of machine 10 are advantageously controlled to permit automatic execution of a machine cycle of operation and to permit operator directed operation. A suitable control is illustrated in FIG. 1 as machine control 80. Referring to FIG. 1, machine control 80 comprises primary processor 82, operator station 84 and electrical interface devices interposed between machine devices and primary processor 82. It is contemplated that primary processor 82 comprise at least one program controlled processor 87 and more particularly comprises so many program controlled processors as appropriate to achieve the desired level of data processing capability to provide functions and features desired for program controlled operation of machine 10. In addition to processors primarily engaged in performing logical operations and data exchanges with memory, one or more processors tailored to performing mathematical operations, such as so-called "math co-processors", may comprise primary processor 82. Operator station 84 permits data exchanges with primary processor 82 by a user. Operator station 84 comprises push buttons and indicators 83 which are connected to interface circuits comprising primary processor 82 and a display 100 for displaying information to an operator. In addition, operator station 84 comprises an auxiliary operator panel 85 for selectors 89 to allow the operator to directly command operation of selected machine devices. Selectors 89 advantageously operate electrical switches to produce signals input to processor 80 or applied directly to machine devices for effecting operation of machine actuators.

Continuing with reference to FIG. 1, interface devices provide facilities for producing control signals for machine devices in response to outputs produced by primary processor 82. In addition, interface devices provide facilities for producing inputs for primary processor 82 in response to sensed conditions of machine devices. Outputs of primary processor 82 defining, for example, position, velocity, and/or acceleration are conditioned as appropriate at motor interface circuits 124 and applied to motor drives such as motor drives 110 and 112 to control electrical current from a suitable power source is delivered to motors, such as for example, motors 40 and 74. As is conventional, signals produced by position transducers 78 and 120 are used for control of motors 40 and 74. Output signals of position transducers 78 and 120 are conditioned by position interface circuits 126 to produce input signals to primary processor 82. Machine input/output interface circuits 122 perform signal conditioning for other signals produced by or applied to machine devices. Examples connections of machine input/output interface circuits with machine devices are illustrated in FIG. 1 as connections with heating elements 20 and with temperature transducer 21. Machine input/output interface circuits 122 are effective to convert signals output by temperature transducer 21 representing temperature of barrel 16 to signals suitable for processing by primary processor 82. In addition, machine input/output interface circuits 122 are effective to use signals output by primary processor 82 to control application of power to heating elements 20. As shown in FIG. 1, electrical connections are provided between interface circuits 122, 124 and 126, and primary processor 82 to permit exchange of signals between primary processor 82 and the interface circuits.

Programs executed by primary processor 82 are stored in local memory 86 of processor 80 and include operating system programs 98 and application programs such as machine control programs 96. Operating system programs effect management of resources of primary processor 82 and of execution of application programs. Machine control programs 96 are executed by processors of primary processor 82 to effect control over machine devices. Machine control programs 96 permit at least two modes of operation of machine 10: (i) an automatic mode for normal production; and (ii) a set-up or manual mode, for preparing the machine and machine devices for production; for permitting operator directed operation of machine devices; and, for setting parameter values used by machine control programs 96 in production of particular articles from particular material. The automatic mode of operation is associated with "AUTO" programs 108, and the set-up or manual mode of operation is associated with the "SET-UP" programs 106. Irrespective of whether the mode of operation is automatic or manual, execution of machine control programs 96 by processor 80 perform logical and arithmetic functions to monitor and control the operation of machine devices, such as motors 40 and 74 which actuate mechanisms of the injection molding machine, heaters 20 and other devices not shown but typical of such machines and associated equipment. In addition, execution of machine control programs 96 can result in commands for establishing modes of operation of cooperating auxiliary devices and equipment to accommodate temporary interruptions of automatic operation of machine 10.

A machine cycle of operation, that is, a sequence of functions performed by machine 10 to produce molded articles, is illustrated by FIG. 3a. Although illustrated as sequential, certain processing functions such as, for example, processing steps 140 (closure of mold assembly 25), and 142 (processing of material at injection unit 14), can be simultaneous. Once a predetermined quantity of plasticized material, so-called melt, has been accumulated within injection unit 14 and the mold has been closed as determined by decision step 144, the accumulated melt is injected into mold cavity 13 as reflected by process step 146. Upon filling of mold cavity 13 with melt, pressure is maintained on the melt by injection unit 14 for a predetermined "Pack & Hold" interval. Determination of expiration of the Pack & Hold period is reflected by decision step 148. Thereafter, mold assembly 25 is opened as reflected by process step 150 and molded articles are removed from the mold cavity 13 ("ejected") as reflected by process step 152. Machine control 80 effects execution of such a machine cycle of operation by execution of "AUTO" programs 108 and the machine cycle of operation can be repeatedly executed without operator intervention to produce plural molded articles.

Figure 3B:
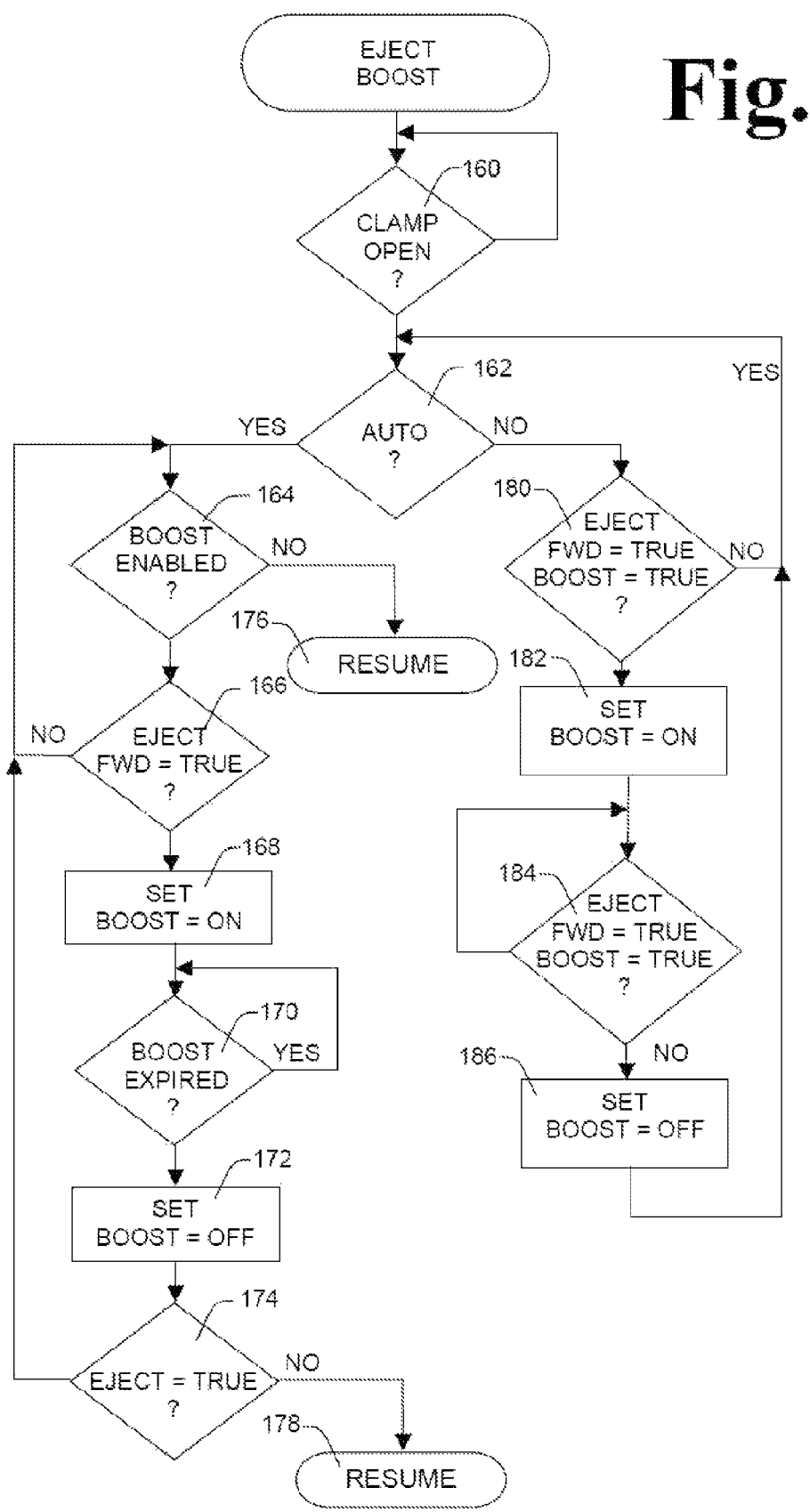

As noted herein, the present invention improves functioning of machines with electrically operated ejector mechanisms to remove molded articles from an opened mold assembly by supplementing force applied by the electrically operated ejector mechanism. FIG. 3b is a flow chart of a procedure for operating ejector mechanism 38 to selectably apply supplemental force. Removal of articles is initiated with mold assembly 25 open. Decision step 160 reflects detection of a condition of clamp assembly 12 associated with mold assembly 25 being open, advantageously reflected by position indicated by position transducer 78. Decision step 162 represents determination of whether machine 10 is being operated under automatic control or under manual control. When operated under automatic control, a procedure beginning at decision step 164 is performed. Decision step 164 reflects determination of whether operation of second actuators 51 and 53 is enabled for the current execution of the machine cycle of operation. That determination may be made by detecting the current value of, for example, an enabling signal established in the course of setting up values used by control 80 in preparation for automatic operation. If enabled, the procedure beginning with decision step 166 is followed. Decision step 166 reflects determination of whether primary ejector actuator 50 is commanded to drive ejector pins 56 toward cavity 13. Once such operation of primary ejector actuator 50 is commanded, second actuators 51 and 53 are commanded to operate to supplement force applied by primary ejector actuator 50 as reflected by process step 168. Process step 168 reflects setting of a value of a command signal ("BOOST") effective to control operation of valve A to apply pressurized hydraulic fluid from a source such as pump 190 to second actuators 51 and 53 to apply force through piston rods 59 to ejector plate 52 in the direction of force applied by actuator 50. Such a signal produced by control 80 is applied to input/output interface circuits 122 to produce control signals to operate valve A.

Operation of valve A to apply pressurized hydraulic fluid to second actuators 51 and 53 will continue for a predetermined period following commencement of operation of primary ejector actuator 50 to drive ejector pins 56 toward cavity 13. At decision step 170 the expiration of the predetermined period of operation of second actuators 51 and 53 is detected. Process step 172 reflects setting the command signal "BOOST" to cease operation of actuators 51 and 53. As is known, ejector pins 56 may be repetitively driven toward and retracted from cavity 13 in a single execution of the machine cycle of operation as a technique to dislodge molded articles from mold surfaces. Hence, during the eject function of the machine cycle of operation, primary ejector actuator 50 may be repetitively commanded to drive ejector pins 56 into cavity 13 and to withdraw, or partially withdraw, ejector pins 56 from cavity 13. Changes of commands controlling operation of primary ejector actuator 50 during the eject function result in changes of a command for control of second actuators 51 and 53 in accordance with steps 166 through 172 of FIG. 3b. Were it not desired to apply supplemental force with such repeated operations of first actuator 50, operation of second actuators 51 and 53 would be disabled until the next repetition of the machine cycle of operation.

Continuing with reference to FIG. 3b, performance of the procedure for operation of ejector mechanism 38 ends with the end of the ejection function (process step 146 of FIG. 3a). Decision step 174 reflects determination of the end of the ejection function leading to resumption of the steps of the procedure of the machine cycle of operation as reflected by process step 178. Had it been determined at decision step 164 that operation of second actuators 51 and 53 was not enabled for the current execution of the machine cycle of operation, steps 166-172 would be skipped and execution of the machine cycle of operation would be resumed as reflected by process step 176.

Were machine 10 not being operated under automatic control, operation of ejector mechanism 38 may nevertheless be initiated by operation of one or more selectors 89 by a machine operator. A procedure for operating second actuators 51 and 53 while manual operation of machine 10 is being performed is reflected by steps beginning with decision step 180. Decision step 180 reflects determination of whether selectors 89 are operated so as to command operation of primary ejector actuator 50 and secondary actuators 51 and 53. Process step 182 reflects commanded operation of second actuators 51 and 53 which continues until a change of the relevant selectors 89 has been detected as reflected at decision step 184. Process step 186 reflects a change of commanded operation of second actuators 51 and 53. The procedure of steps 180-186 is periodically executed so long as operation of machine 10 is controlled manually.

While the invention has been described with reference to a preferred embodiment, and while the preferred embodiment has been illustrated and described with considerable detail, it is not the intention of the inventors that the invention be limited to the detail of the preferred embodiment. Rather, it is intended that the scope of the invention be defined by the appended claims and all equivalents thereto. In particular, while shown and described as hydraulically operated, second actuators may as well be pneumatically operated as noted herein to accommodate, for example, circumstances in which hydraulic operation of machine devices is not desired. In addition, while the operation of second actuators has been illustrated as being controlled by a single valve, use of plural valves, each controlling one or more actuators may be used.

What is claimed is:

1. An apparatus for actuating an ejection device of a molding machine for performing a cycle of operation to mold articles, the ejection device comprising at least one ejector element for contacting a molded article within a mold cavity defined by mating mold members and at least one movable ejector member coupled to the ejector elements for moving the ejector elements, the apparatus comprising:
   a) a first actuator comprising an electrically operated device and coupled to the movable ejector members for moving the movable ejector members to advance the ejector elements into the cavity and retract the ejector elements from the cavity;
   b) at least one second actuator comprising a fluid operated device for supplementing force applied to the ejector elements to separate molded articles from the mating mold members; and
   c) a selector for controlling operation of the second actuators in response to intervention of a machine operator to selectably operate the second actuators to supplement force exerted by the first actuator as the ejector elements are moved in the direction to contact a molded article within the mold cavity.

2. The apparatus according to claim 1 wherein the first actuator comprises an electrically operated rotating machine and a motion converter driven by the rotating machine and coupled to the ejector member, the motion converter converting rotary motion of the rotating machine to linear motion of the ejector member.

3. The apparatus according to claim 2 wherein plural secondary actuators are arranged to supplement force exerted on the movable ejector members by the first actuator.

4. The apparatus according to claim 2 wherein the motion converter comprises a rotatable nut engaging flights of an elongated screw so that rotation of the nut is converted to translation of the elongated screw relative to the nut and the screw is coupled to the movable ejector members.

5. The apparatus according to claim 4 wherein the elongated screw is a roller screw.

6. The apparatus according to claim 1 wherein the second actuators are hydraulically operated piston and cylinder devices wherein pressurized liquid is applied to move a piston relative to a cylinder in which the piston is received and force exerted on the piston is applied to supplement force exerted on the movable ejector members by the first actuator.

7. The apparatus according to claim 6 wherein the first actuator applies force to a center of the ejector member and plural secondary actuators are arranged to apply force at off-center locations of the first actuator.

8. The apparatus according to claim 1 wherein the second actuators are pneumatically operated piston and cylinder devices wherein pressurized gas is applied to move a piston relative to a cylinder in which the piston is disposed and force exerted on the piston is applied to supplement force exerted on the movable ejector members by the first actuator.

9. The apparatus according to claim 1 wherein the selector comprises a switching device directly controlled by a machine operator for operating the second actuators.

10. The apparatus according to claim 1 wherein the selector comprises a switching device controlled by selection by a machine operator for enabling operation of the secondary actuators in response to a signal initiating operation of the actuators during execution of the cycle of operation of the molding machine.

11. An apparatus for actuating an ejection device of a molding machine, the ejection device comprising at least one ejector element for contacting a molded article within a mold cavity defined by mating mold members and at least one movable ejector member coupled to the ejector elements for moving the ejector elements, the apparatus comprising:
   a) a first actuator comprising an electrically operated rotatable machine and a motion converter, the motion converted being driven by the rotatable machine and coupled to the movable ejector members, the motion converter converting rotation of the rotatable machine to linear motion of the ejector members to advance the ejector elements into the cavity and retract the ejector elements from the cavity;
   b) at least one second actuator comprising a fluid operated device for supplementing force applied to the ejector elements to separate molded articles from the mating mold members; and
   c) a selector for controlling operation of the second actuators in response to intervention of a machine operator to selectably operate the second actuators to supplement force exerted by the first actuator as the ejector elements are moved in the direction to contact a molded article within the mold cavity.

12. The apparatus according to claim 11 wherein plural secondary actuators supplement force exerted on the movable members by the first actuator.

13. The apparatus according to claim 11 wherein the motion converter comprises a rotatable nut engaging flights of an elongated screw so that rotation of the nut is converted to translation of the elongated screw relative to the nut and the screw is coupled to the ejector member.

14. The apparatus according to claim 13 wherein the elongated screw is a roller screw.

15. The apparatus according to claim 11 wherein the second actuators are hydraulically operated piston and cylinder devices wherein pressurized liquid is applied to move a piston relative to a cylinder in which the piston is received and force exerted on the piston is applied to supplement force exerted on the movable ejector members by the first actuator.

16. The apparatus according to claim 15 wherein plural secondary actuators are arranged to supplement force exerted on the movable ejector members by the first actuator.

17. The apparatus according to claim 11 wherein the selector comprises a switching device directly controlled by a machine operator for operating the second actuators.

18. The apparatus according to claim 11 wherein the selector comprises a switching device controlled by selection by a machine operator for enabling operation of the secondary actuators in response to a signal initiating operation of the actuators during execution of the cycle of operation of the molding machine.

* * * * *